United States Patent
Yukawa et al.

(10) Patent No.: US 10,723,826 B2
(45) Date of Patent: Jul. 28, 2020

(54) MODIFIER FOR POLYCARBONATE AND METHOD FOR PRODUCING SAME

(71) Applicant: NIPPON A&L INC., Osaka-shi, Osaka (JP)

(72) Inventors: Taisuke Yukawa, Takaishi (JP); Kazuhiro Ishigaki, Niihama (JP)

(73) Assignee: NIPPON A&L INC., Osaka (JP)

( * ) Notice: Subject to any disclaimer, the term of this patent is extended or adjusted under 35 U.S.C. 154(b) by 0 days.

(21) Appl. No.: 15/928,552

(22) Filed: Mar. 22, 2018

(65) Prior Publication Data

US 2018/0273665 A1  Sep. 27, 2018

(30) Foreign Application Priority Data

Mar. 23, 2017 (JP) .................. 2017-057467

(51) Int. Cl.
| | | |
|---|---|---|
| C08L 69/00 | (2006.01) | |
| C08F 255/10 | (2006.01) | |
| C08F 255/02 | (2006.01) | |
| C08L 51/06 | (2006.01) | |

(52) U.S. Cl.
CPC .......... *C08F 255/10* (2013.01); *C08F 255/02* (2013.01); *C08L 51/06* (2013.01); *C08L 69/00* (2013.01); *C08L 2205/03* (2013.01)

(58) Field of Classification Search
CPC ...... C08L 69/00; C08L 51/04; C08L 2205/03; C08L 25/12; C08F 220/44; C08F 255/02
See application file for complete search history.

(56) References Cited

U.S. PATENT DOCUMENTS

| | | | | |
|---|---|---|---|---|
| 5,314,912 A | * | 5/1994 | Yoshitani | ............... C08F 255/00 524/458 |
| 2017/0037175 A1 | | 2/2017 | Ishigaki et al. | |

FOREIGN PATENT DOCUMENTS

| | | |
|---|---|---|
| JP | 2007-070393 A | 3/2007 |
| JP | 2015-121334 A | 7/2015 |
| JP | 2015-137298 A | 7/2015 |
| JP | 2015-212371 A | 11/2015 |
| JP | 2015-212372 A | 11/2015 |
| JP | 2016/023258 A | 2/2016 |
| JP | 2016/117847 A | 6/2016 |
| JP | 2016-117847 A | 6/2016 |

(Continued)

OTHER PUBLICATIONS

Extended European Search Report dated Aug. 16, 2018 in European Patent Application No. 18162943.7, 7 pages.

(Continued)

*Primary Examiner* — Mark S Kaucher
(74) *Attorney, Agent, or Firm* — Squire Patton Boggs (US) LLP (57) ABSTRACT

Provided is a modifier for polycarbonate, comprising: a graft polymer (A) having 30 to 80 parts by mass of a main chain composed of an ethylene-based polymer (a) and 70 to 20 parts by mass of a graft chain composed of a structural unit derived from a vinyl-based monomer (b), with a total amount of the main chain and the graft chain of 100 parts by mass; and a graft polymer (B) prepared by graft polymerization of a vinyl-based monomer to a rubbery polymer, at a mass ratio (A):(B)=9 to 98:91 to 2, wherein the vinyl-based monomer (b) comprises a specific aromatic vinyl monomer and vinyl cyanide monomer.

15 Claims, 2 Drawing Sheets

(56) References Cited

FOREIGN PATENT DOCUMENTS

| JP | 2016/121334 A | 7/2016 |
| WO | WO 2009/042323 A1 | 4/2009 |
| WO | WO 2015/159980 A1 | 10/2015 |

OTHER PUBLICATIONS

Polymer Analysis Handbook (New Version), first issued printing of the First Edition, Jan. 12, 1995, pp. 127-138.
Office action dated Aug. 13, 2019 issued for Japanese Patent Application No. 2017-057467, 4 pages.

* cited by examiner

Fig.1

MODIFIER FOR POLYCARBONATE AND METHOD FOR PRODUCING SAME

TECHNICAL FIELD

The present invention relates to a modifier for polycarbonate and a method for producing the same.

BACKGROUND

Polycarbonate resins are one of the engineering plastics excellent in strength and used in a wide variety of fields such as electric, electronic and optical components, transport equipment and household articles, due to having excellence in physical properties such as transparency, impact resistance, heat resistance, incombustibility, and dimension stability. Among those applications, molded articles made of polycarbonate resin for use in contacting (rubbing) other components cause squeaks due to poor sliding properties of carbonate resin, which is a problem.

Various modifiers for improving the sliding properties of polycarbonate resins, therefore, have been investigated. For example, in Patent Literature 1, a method for improving the sliding properties by adding a specific graft copolymer as modifier to polycarbonate resins is proposed.

CITATION LIST

Patent Literature

[Patent Literature 1] JP 2016-117847 A

SUMMARY

Polycarbonate resins are usually molded by using a mold. As a result of investigation by the present inventors, it has been found that continuous molding of polycarbonate resins containing a conventional modifier described in Patent Literature 1, etc. causes adhesion of deposits on the mold surface. In continuous production of molded bodies, it is therefore required to remove the deposits on the mold surface, resulting in reduction in the productivity. It is also required for the polycarbonate resins for use in the applications described above to have a good appearance, particularly without yellow tint.

An object of the present invention is, therefore, to provide a modifier to be added to polycarbonate resins to produce molded articles having improved sliding properties and a good appearance, with mold contamination sufficiently prevented, and a method for producing the same.

Through extensive research for solving the problem by the present inventors, it was found that a specific modifier can solve the problem, so that the present invention has been accomplished.

In other words, the present invention in an aspect is a modifier for polycarbonate, comprising: a graft polymer (A) having 30 to 80 parts by mass of a main chain composed of an ethylene-based polymer (a) and 70 to 20 parts by mass of a graft chain composed of a structural unit derived from a vinyl-based monomer (b), with a total amount of the main chain and the graft chain of 100 parts by mass; and a graft polymer (B) prepared by graft polymerization of a vinyl-based monomer to a rubbery polymer, at a mass ratio (A):(B)=9 to 98:91 to 2, wherein the vinyl-based monomer (b) comprises an aromatic vinyl monomer and a vinyl cyanide monomer, and a ratio of an absorbance derived from the vinyl cyanide monomer ($\alpha 2$) to an absorbance derived from the aromatic vinyl monomer ($\alpha 1$), $\alpha 2/\alpha 1$, is 0.1 or more and less than 0.93.

It is preferable that the above $\alpha 2/\alpha 1$ be 0.3 or more and 0.85 or less.

It is preferable that the ethylene-based polymer (a) have a number average molecular weight of 10000 to 50000, a molecular distribution of 5 to 15, and a proportion of the polymer having a molecular weight of 10000 or less of 5.5% or more, and it is also preferable that the ethylene-based polymer (a) have an activation energy of flow of 40 to 120 kJ/mol.

The present invention in another aspect is a method for producing a modifier for polycarbonate, comprising: a polymerization step of synthesizing a graft polymer (A) by graft polymerization of 70 to 20 parts by mass of a vinyl-based monomer (b) in the presence of 30 to 80 parts by mass of an ethylene-based polymer (a), with a total amount of (a) and (b) being 100 parts by mass, the vinyl-based monomer (b) containing 1 mass % or more and 35 mass % or less of a vinyl cyanide monomer; and a mixing step of mixing the resulting graft polymer (A) with a graft polymer (B) prepared by graft polymerization of a vinyl-based monomer to a rubbery polymer.

In the mixing step, it is preferable to melt-knead the graft polymer (A) and the graft polymer (B).

According to the present invention, a modifier to be added to polycarbonate resins to produce molded articles having improved sliding properties and a good appearance, with mold contamination sufficiently prevented, and a method for producing the same can be provided.

DETAILED DESCRIPTION

<Modifier for Polycarbonate>

The modifier for polycarbonate in the present embodiment (hereinafter also referred to simply as "modifier") contains a graft polymer (A) and a graft polymer (B). The modifier is used particularly for improving the sliding properties of polycarbonate resins. Each of the components is described as follows.

[Graft Polymer (A)]

The graft polymer (A) has a main chain composed of an ethylene-based polymer (a) and a graft chain composed of a structural unit derived from a vinyl-based monomer (b).

Examples of the ethylene-based polymer (a) may include polymers having monomer units based on ethylene as the main unit (typical content of the monomer units based on ethylene is 50 mol % or more per 100 mol % of all monomer units constituting a polymer) such as ethylene homopolymers, ethylene-α-olefin copolymers, ethylene-vinyl acetate copolymers, ethylene-acrylic acid copolymers, ethylene-acrylate copolymers, ethylene-methacrylic acid copolymers, ethylene-methacrylate copolymers, and ethylene-cyclic olefin copolymers.

Examples of the ethylene homopolymers include polyethylene. Examples of the α-olefin of the ethylene-α-olefin copolymer include α-olefins having 3 to 20 carbon atoms such as propylene, 1-butene, 1-pentene, 1-hexene, 1-heptene, 1-octene, 1-nonene, 1-decene, 1-dodecene, 4-methyl-1-pentene, and 4-methyl-1-hexene. One or more of these may be used.

Examples of the ethylene-α-olefin copolymers include ethylene-propylene copolymers, ethylene-1-butene copolymers, ethylene-1-hexene copolymers, ethylene-1-octene copolymers, and ethylene-1-butene-1-hexene copolymers.

It is preferable that the ethylene-based polymer (a) be an ethylene-α-olefin copolymer containing ethylene and an α-olefin having 3 to 20 carbon atoms as the copolymerization components.

Although the size of the ethylene-based polymer (a) is not limited, the equivalent number average particle size [(long side+short side)/2] is preferably 500 to 4500 μm, more preferably 700 to 3500 μm, still more preferably 1000 to 3000 μm, particularly preferably 1000 to 2700 μm.

The ethylene-based polymer (a) can be used in a pellet form. In that case, monomers such as aromatic vinyl monomers can be more easily graft polymerized as the surface area of the pellet increases. It is preferable that the equivalent number average particle size of the pellet [(long side+short side)/2] be within the range.

It is preferable that the ethylene-based polymer (a) have a number average molecular weight of 10000 to 50000, a molecular distribution of 5 to 15, and a proportion of the polymer having a molecular weight of 10000 or less of 5.5% or more, from the viewpoint of further improving the sliding properties of polycarbonate resins.

Figure 1:
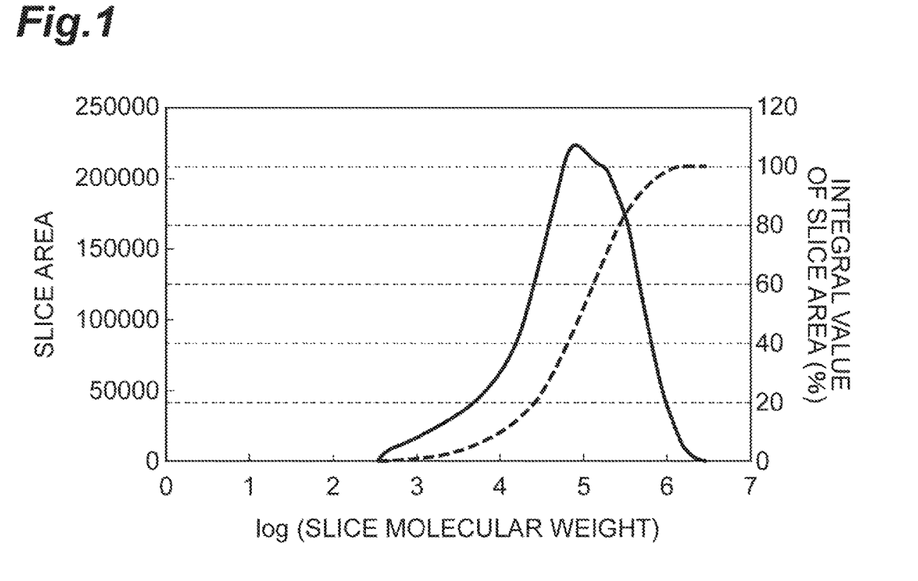
FIG. 1 is a chart for determining the proportion of an ethylene-based polymer having a molecular weight of 10000 or less.

The number average molecular weight, the molecular distribution, and the proportion of the polymer having a molecular weight of 10000 or less of the ethylene-based polymer (a) can be determined by using gel permeation chromatography (GPC). Specifically, the weight average molecular weight and the number average molecular weight were obtained by conversion from the calibration curve using standard polystyrene, so as to calculate the molecular distribution (weight average molecular weight/number average molecular weight). As shown in FIG. 1, the proportion of the polymer having a molecular weight of 10000 or less is the integrated value (%) at a slice molecular weight of 10000 in the integrated value curve of the slice area drawn from the molecular weight distribution curve of slice molecular weight versus slice area.

The activation energy of flow of the ethylene-based polymer (a) is preferably 40 to 120 kJ/mol, more preferably 50 to 110 kJ/mol, still more preferably 60 to 100 kJ/mol, from the viewpoint of further improving the sliding properties of polycarbonate resins. The activation energy of flow of the ethylene-based polymer (a) can be adjusted, for example, by known techniques described in JP 3344015 B2 and JP 4543706 B2.

In order to obtain the activation energy of flow of the ethylene-based polymer (a), the melt complex viscosity-angular frequency curve at 130° C., 150° C., 170° C. and 190° C. is measured under the following measurement conditions by using a viscoelasticity measuring apparatus (melt viscoelasticity measuring apparatus ARES, manufactured by TA Instruments Japan Inc.), and then from the resulting melt complex viscosity-angular frequency curve, the activation energy (Ea) can be determined by using a calculation software TA ORCHESTRATOR SOFTWARE V7.0.8.23, manufactured by TA Instruments Japan Inc. Note that the Arrhenius equation for shift factor ($a_T$) is represented as follows:

$$\log(a_T) = Ea/R(1/T - 1/T_0)$$

wherein R is the gas constant, and $T_0$ is the reference temperature (463K). When the correlation coefficient $r^2$ obtained is 0.99 or more in a linearly approximated Arrhenius plot log ($a_T$)–(1/T), the Ea value is assumed to be the activation energy of flow in the present invention.

<Measurement Conditions>
Geometry: parallel plate
Plate diameter: 25 mm
Distance between plates (at the start of measurement): 1.5 mm
Strain: 5%
Angular frequency: 0.1 to 100 rad/sec
Measurement atmosphere: under nitrogen The density of the ethylene-based polymer (a) is preferably 0.900 g/cm$^3$ or more and less than 0.966 g/cm$^3$, more preferably 0.905 g/cm$^3$ or more and less than 0.951 g/cm$^3$, still more preferably 0.910 g/cm$^3$ or more and less than 0.941 g/cm$^3$, particularly preferably 0.915 g/cm$^3$ or more and less than 0.931 g/cm$^3$ from the viewpoint of further improving the sliding properties of polycarbonate resins. The density is measured in accordance with JIS K7112.

It is preferable that the melt flow rate of the ethylene-based polymer (a) be 0.3 to 5 (g/10 min) from the viewpoint of further improving the sliding properties. The melt flow rate in the specification refers to a value measured under conditions at a temperature of 190° C. with a load of 21.2 N in accordance with JIS K7210.

The vinyl-based monomer (b) comprises an aromatic vinyl monomer and a vinyl cyanide monomer.

Examples of the aromatic vinyl monomer include styrene, α-methyl styrene, para-methyl styrene, and bromostyrene. One or more of these may be used. Among these, styrene or α-methyl styrene is preferred.

Examples of the vinyl cyanide monomer include acrylonitrile, methacrylonitrile, ethacrylonitrile, and fumaronitrile. One or more of these may be used. Among these, acrylonitrile or methacrylonitrile is preferred.

The vinyl-based monomer (b) may further comprise other vinyl-based monomers which can be copolymerized with an aromatic vinyl monomer and a vinyl cyanide monomer. Examples of the other vinyl-based monomers include (meth)acrylate monomers such as methyl (meth)acrylate, ethyl (meth)acrylate, propyl (meth)acrylate, butyl (meth)acrylate, 2-ethylhexylacrylate, phenyl (meth)acrylate, 4-t-butylphenyl (meth)acrylate, bromophenyl (meth)acrylate, dibromophenyl (meth)acrylate, 2,4,6-tribromophenyl (meth)acrylate, monochlorophenyl (meth)acrylate, dichlorophenyl (meth)acrylate and trichlorophenyl (meth)acrylate; and maleimide monomers such as N-phenyl maleimide and N-cyclohexyl maleimide.

The graft polymer (A) has 30 to 80 parts by mass of a main chain composed of the ethylene-based polymer (a) and 70 to 20 parts by mass of a graft chain composed of a structural unit derived from a vinyl-based monomer (b), with a total amount of the main chain and the graft chain of 100 parts by mass. With a content of the main chain composed of the ethylene-based polymer (a) of less than 30 parts by mass, satisfactory sliding properties are hardly obtained when the graft polymer (A) is blended into a carbonate resin, while with a content of more than 80 parts by mass, delamination tends to occur when the graft polymer (A) is blended into a carbonate resin. The contents of the main chain and the graft chain are preferably 35 to 75 parts by mass and 65 to 25 parts by mass, respectively, more preferably 40 to 70 parts by mass and 60 to 30 parts by mass, respectively.

In the graft polymer (A), the content of the structural unit derived from a vinyl cyanide monomer based on all structural units derived from the vinyl-based monomer (b) is preferably 1 mass % or more and less than 25 mass %, more preferably 5 mass % or more and 24 mass % or less, still more preferably 10 mass % or more and 23 mass % or less.

The graft ratio of the graft polymer (A) is preferably 30% or more, more preferably 35% or more, from the viewpoint of preventing the delamination of a polycarbonate resin, though not particularly limited.

The content of each of the structural units in the main chain and the graft chain of the graft polymer (A) and the graft ratio can be measured, for example, by the method described in Examples, when information on the charging ratio and the like in the step of producing the graft polymer (A) are available.

Alternatively, even when information on the charging ratio and the like in the step of producing the graft polymer (A) are not available, the content of each of the structural units in the main chain and the graft chain of the graft polymer (A) can be measured by the following method.

First, prepared are a plurality of graft polymers having a main chain composed of an ethylene-based polymer and a graft chain composed of a structural unit derived from a vinyl-based monomer, each having a different composition ratio of the ethylene-based polymer and the structural unit derived from the vinyl-based monomer and a known composition. The graft polymers are subjected to gas chromatography analysis described below, so as to make a calibration curve.

Subsequently, a graft polymer to be measured is prepared and subjected to gas chromatography analysis in the same manner, so that the composition ratio of each of the components are determined with use of the calibration curve.

(Gas Chromatography Analysis)

A graft polymer is melt-kneaded by using a single screw kneading machine (IMC-19D1) manufactured by Imoto Machinery Co., Ltd., under conditions with a screw temperature preset at 170° C. at the inlet and at 200° C. toward the outlet of the kneading machine, with a screw revolution of 100 rpm, so that pellets are obtained. The resulting pellet is subjected to gas chromatography analysis under the following conditions.

(Conditions)

Model: 7890A GC System/5975C VL MSD manufactured by Agilent Technologies, Inc.

Column: Ultra ALLOY-5

Length (30 m)× Inner diameter (0.25 mm)×Film thickness (0.25 μm)

Oven temperature: 70° C. to 320° C. (20° C./min) (10-min hold)

Inlet temperature: 320° C.

Interface temperature: 320° C.

Carrier gas: helium (flow rate 1 ml/min)

Split ratio: 1/150

Mass range: 10 to 425 (m/z)

Solvent waiting time: 1.7 min

Amount of sample: 3 mg

Conditions for generating gas: 6-min hold at 260° C., INTF temperature (320° C.)

In the graft polymer (A), the ratio of the absorbance derived from the vinyl cyanide monomer ($\alpha 2$) to the absorbance derived from the aromatic vinyl monomer ($\alpha 1$) ($\alpha 2/\alpha 1$), is 0.1 or more and less than 0.93. With a ratio $\alpha 2/\alpha 1$ of 0.93 or more, the appearance is worsened when a modifier is added to a polycarbonate resin. The ratio $\alpha 2/\alpha 1$ is preferably 0.3 or more and 0.85 or less, more preferably 0.5 or more and 0.8 or less.

The absorbance derived from an aromatic vinyl monomer and the absorbance derived from a vinyl cyanide monomer can be measured by the following method.

A graft polymer is melt-kneaded by using a single screw kneading machine (IMC-19D1) manufactured by Imoto Machinery Co., Ltd., under conditions with a screw temperature preset at 170° C. at the inlet and at 200° C. toward the outlet of the kneading machine, with a screw revolution of 100 rpm, so that pellets are obtained. A thin film of the resulting pellet is then made by using a hot pressing machine, and the absorbance of the thin film is measured by using a Fourier transform infrared spectrometer (Spectrum One manufactured by PerkinElmer, Inc.). On that occasion, among the peaks derived from an aromatic vinyl monomer, the absorbance at the wavelength in the vicinity of 1602 cm$^{-1}$ derived from aromatic rings is assumed to be "absorbance derived from an aromatic vinyl monomer ($\alpha 1$)", and among the peaks derived from a vinyl cyanide monomer, the absorbance at the wavelength in the vicinity of 2238 cm$^{-1}$ derived from cyano groups is assumed to be "absorbance derived from vinyl cyanide monomer ($\alpha 2$)".

[Graft Polymer (B)]

The graft polymer (B) is a graft polymer prepared by graft polymerization of a vinyl-based monomer to a rubbery polymer.

Examples of the rubbery polymer include diene rubbers such as polybutadiene, polyisoprene, butadiene-styrene copolymers, isoprene-styrene copolymers, butadiene-acrylonitrile copolymers, butadiene-isoprene-styrene copolymers, and polychloroprene; acrylic rubbers such as polybutylacrylate; ethylene-$\alpha$-olefin-nonconjugated dien copolymers; polyorganosiloxane rubbers; and further composite rubbers consisting of two or more of those rubbers. These may be used alone or two or more of them may be used in combination.

The vinyl-based monomer for use may be the same as the vinyl-based monomer (b).

Specific Examples of the graft polymer (B) include acrylonitrile-butadiene rubber-styrene polymers (ABS resins), acrylonitrile-acrylic rubber-styrene polymers (AAS resins), methyl methacrylate-butadiene rubber-styrene resins (MBS resins), and acrylonitrile-ethylene-propylene rubber-styrene polymers (AES resins). Among these, MBS resins are preferred from the viewpoint of preventing delamination of a polycarbonate resin.

The modifier in the present embodiment contains the graft polymer (A) and the graft polymer (B), such that the mass ratio between the graft polymer (A) and the graft polymer (B) satisfies (A):(B)=9 to 98:91 to 2. With a mass ratio of the graft polymer (A) of less than the lower limit, satisfactory sliding properties cannot be obtained; while with a mass ratio of the graft polymer (A) of more than the upper limit, satisfactory effect for preventing mold contamination cannot be obtained. The mass ratio between the graft polymer (A) and the graft polymer (B) is preferably 15 to 95:85 to 5, more preferably 25 to 90:75 to 10.

<Method for Producing Modifier>

The method for producing a modifier in the present embodiment comprises a polymerization step of synthesizing a graft polymer (A) by graft polymerization of 70 to 20 parts by mass of a vinyl-based monomer (b) in the presence of 30 to 80 parts by mass of an ethylene-based polymer (a), with a total amount of (a) and (b) being 100 parts by mass, the vinyl-based monomer (b) containing 1 mass % or more and 35 mass % or less of a vinyl cyanide monomer, and a mixing step of mixing the resulting graft polymer (A) with a graft polymer (B) prepared by graft polymerization of a vinyl-based monomer to a rubbery polymer.

The modifier described above can be produced by the production method in the present embodiment, and the ones described above are used as the ethylene-based polymer (a), the vinyl-based monomer (b), and the graft polymer (B).

The mass ratio between the ethylene-based polymer (a) and the vinyl-based monomer (b) is preferably 35 to 75:65 to 25, more preferably 40 to 70:60 to 30.

The vinyl-based monomer (b) contains preferably 5 mass % or more and 33 mass % or less of a vinyl cyanide monomer, and more preferably 10 mass % or more and 31% mass % or less of a vinyl cyanide monomer. Also, the vinyl-based monomer (b) contains preferably 65 mass % or more and 99 mass % or less of an aromatic vinyl monomer, more preferably 67 mass % or more and 95 mass % or less of an aromatic vinyl monomer, still more preferably 69 mass % or more and 90 mass % or less of an aromatic vinyl monomer.

Although the polymerization method in the polymerization step may be obtained by emulsion polymerization, suspension polymerization, bulk polymerization, solution polymerization, and a combination thereof without particular limitations, use of suspension polymerization is preferred.

In the mixing step, the graft polymer (A) and the graft polymer (B) may be separately added to a polycarbonate resin followed by mixing, or the graft polymer (A) and the graft polymer (B) may be premixed and then added to a polycarbonate resin. In the case of using the premixture, it is preferable the graft polymer (A) and the graft polymer (B) be melt-kneaded to form into pellets for use, from the viewpoint of handleability.

In the mixing step, a known kneading apparatus such as extruders, rolls, Banbury mixers, and kneaders may be used.

[Polycarbonate Resin]

The amount of the modifier added to a polycarbonate resin in the present embodiment may be appropriately adjusted depending on the use of the polycarbonate resin and the like, and, for example, may be 0.5 to 28 parts by mass, preferably 1 to 25 parts by mass, more preferably 2 to 20 parts by mass, per 100 parts by mass of a polycarbonate resin.

The polycarbonate resin is a polymer obtained by a phosgene method in which various dihydroxydiaryl compounds are reacted with phosgene, or an ester exchange method in which dihydroxydiaryl compounds are reacted with carbonates such as diphenyl carbonate, and typical examples thereof include a polycarbonate resin made from 2,2-bis(4-hydroxyphenyl)propane; "bisphenol A".

Examples of the dihydroxydiaryl compounds other than bisphenol A include bis(hydroxyaryl)alkanes such as bis(4-hydroxydiphenyl)methane, 1,1-bis(4-hydroxyphenyl)ethane, 2,2-bis(4-hydroxyphenyl)butane, 2,2-bis(4-hydroxyphenyl)octane, bisbis(4-hydroxydiphenyl)phenylmethane, 2,2-bis(4-hydroxydiphenyl-3-methylphenyl)propane, 1,1-bis(4-hydroxy-3-tertiarybutylphenyl)propane, 2,2-bis(4-hydroxy-3-bromophenyl)propane, 2,2-bis(4-hydroxy-3,5di-bromophenyl)propane, and 2,2-bis(4-hydroxy-3,5-dichlorophenyl)propane; bis(hydroxyaryl)cycloalkanes such as 1,1-bis(4-hydroxyphenyl)cyclopentane and 1,1-bis(4-hydroxyphenyl)cyclohexane; dihydroxy diaryl ethers such as 4,4'-dihydroxy diphenyl ether and 4,4'-dihydroxy-3,3'-dimethyl diphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide; and dihydroxydiaryl sulfones such as 4,4'-dihydroxydiphenyl sulfone and 4,4'-dihydroxy-3,3'-dimethyldiphenyl sulfone. These may be used singly or two or more of these may be mixed for use.

Besides the ones described above, piperazine, dipiperidyl hydroquinone, resorcin, and 4,4'-dihydroxydiphenyls may be mixed.

Furthermore, the dihydroxydiaryl compounds may be mixed with the following tri- or more valent-phenol compounds for use. Examples of the tri- or more valent-phenol include phloroglucin, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, and 2,2-bis-(4,4'-(4,4'-hydroxyphenyl)cyclohexyl)propane.

In producing the polycarbonate resin, the weight average molecular weight is usually 10000 to 80000, preferably 15000 to 60000. In the production, a molecular weight controller, a catalyst, etc. may be used on an as needed basis.

Known additives such as pigments, dyes, reinforcing agents (talc, mica, clay, glass fiber, etc.), UV absorbing agents, antioxidants, lubricants, mold releasing agents, plasticizers, flame retardants, antistatic agents, and inorganic or organic antibacterial agents may be further blended into the polycarbonate resin during such as mixing or molding of the resin depending on the purpose within the range not impairing the object of the present invention.

EXAMPLES

The present invention is specifically described with reference to the following Examples, though the present invention is not limited thereto. In Examples, parts and % are based on mass.

<Production of Graft Polymer (A)>

Graft polymers (A-1) to (A-4) were produced by the following method. Note that the ethylene-based polymer (trade name "SUMIKASEN EPGT 140" manufactured by Sumitomo Chemical Co., Ltd.) is "ethylene-1-butene-1-hexene copolymer" having the following physical properties.

Fluidity: 0.9 (g/10 min)
Density: 0.918 (g/cm)
Number average molecular weight: 18000
Weight average molecular weight: 180000
Molecular weight distribution: 10
Proportion of polymer having a molecular weight of 10000 or less: 9.6(%)
Equivalent number average particle diameter: 3700 μm
Activation energy of flow: 70 (kJ/mol)

[Graft Polymer (A-1)]

A 100-L pressure resistant vessel was charged with 300 parts of deionized water, 0.12 parts of polyoxyethylene polyoxypropylene glycol (PLURONIC F-68), 0.6 parts of magnesium sulfate, and 60 parts of an ethylene-based polymer (trade name "SUMIKASEN EP GT140" manufactured by Sumitomo Chemical Co., Ltd.), and purged with nitrogen while being stirred. The vessel was then charged with a monomer mixture composed of 28 parts of styrene, 12 parts of acrylonitrile, 1.1 parts of tert-butylperoxy pivalate (B(PV)), 0.1 parts of tert-butylperoxy-2-ethylhexanoate (Kayaester O) and 0.05 parts of 1,4-benzoquinone, and 50 parts of deionized water, and purged with nitrogen. The temperature inside the vessel was raised to 85° C., and the reaction was continued for 1 hour after the temperature reached 85° C. After completion of the reaction, the temperature inside the vessel was cooled to 40° C., and the product was collected, washed and dried to obtain a graft polymer (A-1).

[Graft Polymer (A-2)]

A graft polymer (A-2) was obtained in the same manner as in (A-1), except that the amounts of the ethylene-based polymer, styrene and acrylonitrile charged were changed to 52.6 parts, 35.3 parts and 12.1 parts, respectively.

[Graft Polymer (A-3)]

A graft polymer (A-3) was obtained in the same manner as in (A-1), except that the amounts of styrene and acrylonitrile charged were changed to 31.5 parts and 8.5 parts, respectively.

[Graft Polymer (A-4)]

A graft polymer (A-4) was obtained in the same manner as in (A-1), except that the amounts of styrene and acrylonitrile charged were changed to 25.5 parts and 14.5 parts, respectively.

<Evaluation of Graft Polymers>

The obtained graft polymers were subjected to the evaluations by the following method. The results are shown in Table 1.

[Measurement of Ethylene-Based Polymer Content (PE Content) of Graft Polymer]

The above is described using the graft polymer (A-1) as an example. The graft polymer (A-1) in an amount of 92 parts was obtained after drying. By assuming that 99% of the ethylene-based polymer charged is contained in the graft polymer, the ethylene-based polymer content of the graft polymer (A-1) can be determined from the following equation (1).

$$\text{ethylene-based polymer content (\%)} = \quad (1)$$
$$[\{\text{amount of ethylene-based polymer charged (parts)} \times 0.99\}/\text{mass of graft polymer (parts)}] \times$$
$$100 = [(60 \times 0.99)/92] \times 100 = 64.5 \ (\%)$$

[Measurement of Graft Ratio]

The above is described using the graft polymer (A-1) as an example. By separating the graft polymer (A-1) with use of dichloromethane, the mass ratio of the part undissolved in dichloromethane was determined to be 89.9%. Since the ethylene-based polymer is present in the part undissolved in dichloromethane, the graft ratio can be determined from the following equation (2).

$$\text{Graft ratio (\%)} = \quad (2)$$
$$[\{\text{mass ratio of part undissolved in dichloromethane}$$
$$(\%)\text{-ethylene-based polymer content (\%)}\}/$$
$$\text{ethylene-based polymer content (\%)}] \times 100 =$$
$$(89.9 - 64.5)/64.5 \times 100 = 39.4 \ (\%)$$

[Method for Measuring Content of Structural Unit Derived from Acrylonitrile of Graft Polymer (ACN Content)]

By using an organic trace element (CHN) analyzer JM10 (manufactured by J-Science Lab Co., Ltd.), the nitrogen atom content in a graft polymer was obtained with use of antipyrine, phenacetin and acetanilide as reference samples for making a calibration curve. The graft polymer was melt-kneaded once to make a sample having a uniform composition for use.

Since all of the nitrogen atoms contained in the graft polymer are derived from acrylonitrile, a proportional relationship is formed between the nitrogen atom content and the acrylonitrile content. Since a nitrogen atom has an atomic weight of 14, and acrylonitrile has a molecular weight of 53, the content of a structural unit derived from acrylonitrile can be determined from the following equation (3).

Content of structural unit derived from acrylonitrile
$$(\%) = \text{nitrogen atom content (\%)} \times 53/14 \quad (3)$$

[Method for Measuring Content of Structural Unit Derived from Styrene of Graft Polymer (STY Content)]

The content of the structural unit derived from styrene can be determined from the following equation (4).

Content of structural unit derived from styrene
$$(\%) = 100\text{-ethylene-based polymer content (\%)-}$$
$$\text{content of structural unit derived from acrylonitrile (\%)} \quad (4)$$

[Measurement of Absorbance Ratio Between Acrylonitrile and Styrene of Graft Polymer]

A graft polymer was melt-kneaded by using a single screw kneading machine (IMC-19D1) manufactured by Imoto Machinery Co., Ltd., under conditions with a screw temperature preset at 170° C. at the inlet and at 200° C. toward the outlet of the kneading machine, with a screw revolution of 100 rpm, so that pellets were obtained. A thin film of the resulting pellet was then made by using a hot pressing machine, and the absorbance of the thin film was measured by using a Fourier transform infrared spectrometer (Spectrum One manufactured by PerkinElmer, Inc.) so as to determine the ratio of the absorbance in the vicinity of 2238 $cm^{-1}$ derived from acrylonitrile (ACN) to the absorbance in the vicinity of 1602 $cm^{-1}$ derived from styrene (STY), ACN/STY.

TABLE 1

| | Item | Graft polymer | | | |
| | | (A-1) | (A-2) | (A-3) | (A-4) |
|---|---|---|---|---|---|
| Content in graft polymer | PE (%) | 64.5 | 55.4 | 64.1 | 63.5 |
| | ACN (%) | 7.8 | 8.9 | 6.1 | 9.2 |
| | STY (%) | 27.7 | 35.7 | 29.8 | 27.3 |
| | ACN/(ACN + STY) | 22.0 | 20.0 | 17.0 | 25.2 |
| Graft ratio of graft polymer (%) | | 39.4 | 44.7 | 38.0 | 41.9 |
| Absorbance | ACN | 0.1044 | 0.1530 | 0.0940 | 0.0837 |
| | STY | 0.1382 | 0.2115 | 0.1703 | 0.0901 |
| | ACN/STY | 0.76 | 0.72 | 0.55 | 0.93 |

Examples 1 to 8, Comparative Examples 1 to 4

After mixing 100 parts of a polycarbonate resin (CALIBRE 200-15 (trade name), manufactured by Sumika Styron Polycarbonate Ltd.) and a modifier composed of the graft polymer (A) and the graft polymer (B) (MBS: KANE ACE M-711 (trade name), manufactured by Kaneka Corporation) at the ratio described in Table 2 (in Comparative Example 1, the graft polymer (A) alone), the mixture was melt-kneaded by using a 35-mm twin screw extruder at 270° C. so as to obtain pellets.

The obtained pellets were molded into various injection molded articles using an injection molding machine preset at 270° C. by the following method so as to be subjected to a friction test, a delamination test, color evaluation, and mold contamination evaluation. The evaluation results are shown in Table 2.

Although the experiments were performed by two methods, i.e., a method in which the graft polymers (A) and (B) are separately added, and a method in which the graft polymers (A) and (B) are mixed and then melt-kneaded at 220° C. by using a 40-mm single screw extruder so as to make pellets, which are mixed with a polycarbonate resin, no difference was found in the results.

[Evaluation of Sliding Properties (Friction Test)]

A bottom side specimen and a top side specimen described below were prepared.

Bottom side specimen: a tabular specimen (length×width×thickness=15 cm×9 cm×3 mm, glossy surface) obtained by injection molding of the obtained pellets Top side specimen: a specimen (length×width×thickness=4 cm×4 cm×3 mm) cut out from a tabular specimen (length×width×thickness=15 cm×9 cm×3 mm, glossy surface) obtained by injection molding of a super heat-resistant ABS resin (KU-630R-3, manufactured by Nippon A&L Inc.)

Figure 2:
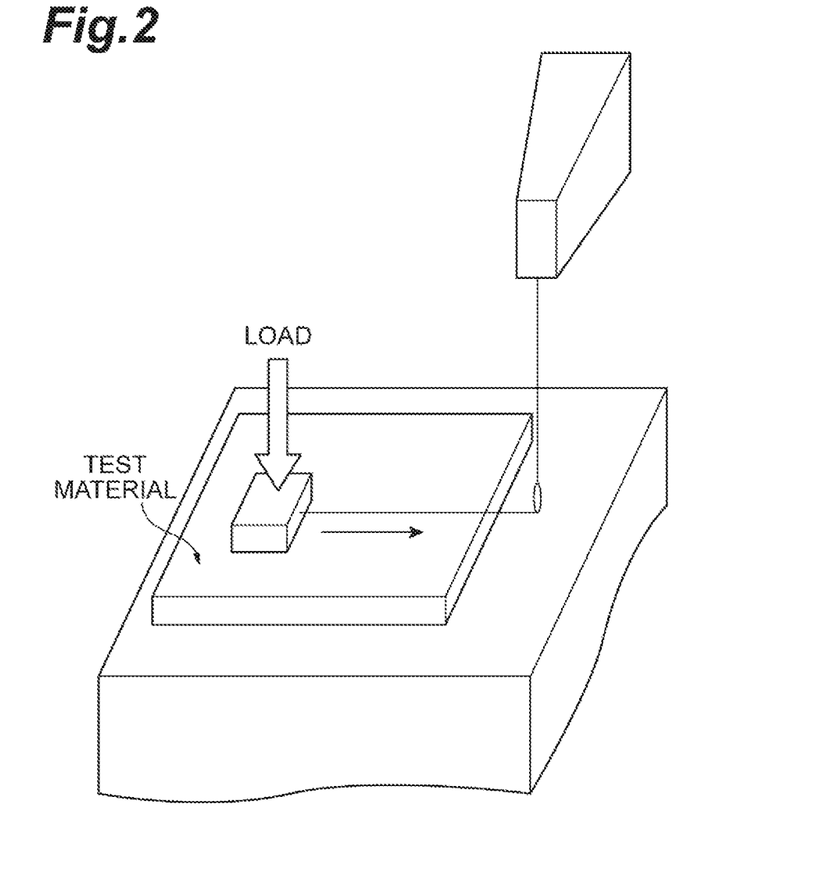
FIG. 2 is a diagram illustrating a friction test.

After each of the specimens were left to stand in a thermostatic chamber at 23° C. and a humidity of 50% for 24 hours, as shown in FIG. 2, two sheets of the top side specimen and the bottom side specimen (test materials in drawing) were superimposed. The testing force produced when the top side specimen with a 1.389 kg load put on the top was pulled at a constant velocity of 50 mm per minute was measured by a load cell so as to determine the reduction ratio from the following equation (5) for three-grade evaluation.

Reduction ratio (%)=[(a−b)/a]×100    (5)

a: Testing force without addition of modifier
b: Testing force with addition of modifier
(Evaluation)
A: Reduction ratio 30% or more
B: Reduction ratio 10%0/or more and less than 30%
C: Reduction ratio less than 10%

[Delamination Test]

The gate part of a tabular specimen (length×width×thickness=15 cm×9 cm×3 mm, glossy surface) obtained by injection molding of the obtained pellets was incised with a cutter so as to determine the occurrence of delamination.
A: Absence of delamination
B: Presence of delamination

[Color Evaluation]

The following specimen was prepared.

A tabular specimen (length×width×thickness=9 cm×5.5 cm×2.5 mm, glossy surface) obtained by injection molding of the obtained pellets After the specimen was left to stand in a thermostatic chamber at 23° C. and a humidity of 50% for 24 hours, YI was measured by SCE method with use of a fast spectrophotometric color meter (CMS-35SP JC2, manufactured by Murakami Color Research Laboratory Co., Ltd.), and evaluated as follows. Note that with an YI of 40 or more, the color is determined to be strongly yellowish even by visual inspection.

(Evaluation)
A: YI=less than 40
B: YI=40 or more

[Mold Contamination Evaluation]

After 140 sheets of molded articles were molded at 38 g per shot from the obtained pellets under conditions at a molding temperature of 270° C., a mold temperature of 60° C., and a molding cycle of 30 seconds, by using a molding machine J110AD-180H (electric injection molding machine manufactured by Japan Steel Works, Ltd.), evaluation was performed based on the following criteria.

(Evaluation)
A: No change was observed on the mold surface.
B: Deposits were observed on the mold surface.

TABLE 2

| Item | | | | Example | | | | | | | | Comparative Example | | | |
|---|---|---|---|---|---|---|---|---|---|---|---|---|---|---|---|
| | | | Mass ratio | | | | | | | | | | | | |
| | (A) | (B) | (A)/(B) | 1 | 2 | 3 | 4 | 5 | 6 | 7 | 8 | 1 | 2 | 3 | 4 |
| Modifier | (A-1) | MBS | 83/17 | 6 | — | — | — | — | — | — | — | — | — | — | — |
| | (A-1) | MBS | 80/20 | — | 6 | — | — | — | — | — | — | — | — | — | — |
| | (A-2) | MBS | 80/20 | — | — | 6 | — | — | — | — | — | — | — | — | — |
| | (A-3) | MBS | 90/10 | — | — | — | — | — | — | — | 5.5 | — | — | — | — |
| | (A-3) | MBS | 80/20 | — | — | — | 6 | 14.5 | 4 | — | — | — | — | — | — |
| | (A-3) | MBS | 30/70 | — | — | — | — | — | — | 14 | — | — | — | — | — |
| | (A-3) | MBS | 5/95 | — | — | — | — | — | — | — | — | — | 6 | — | — |
| | (A-3) | MBS | 100/0 | — | — | — | — | — | — | — | — | — | — | 5 | — |
| | (A-4) | MBS | 80/20 | — | — | — | — | — | — | — | — | — | — | — | 6 |
| Evaluation | Sliding properties after kneading of PC | | | A | A | A | A | A | A | A | A | C | C | A | A |
| | Delamination properties | | | A | A | A | A | A | A | A | A | A | A | A | A |
| | Color evaluation | | | A | A | A | A | A | A | A | A | A | A | A | B |
| | Mold contamination | | | A | A | A | A | A | A | A | A | A | A | B | A |

What is claimed is:

1. A polycarbonate modified by a modifier, comprising: a modifier and a polycarbonate resin, wherein the modifier comprises:

a graft polymer (A) having 30 to 80 parts by mass of a main chain composed of an ethylene copolymer (a) and 70 to 20 parts by mass of a graft chain composed of a structural unit derived from a vinyl-based monomer (b), with a total amount of the main chain and the graft chain of 100 parts by mass; and a graft polymer (B) prepared by graft polymerization of a vinyl-based monomer to a rubbery polymer, at a mass ratio (A):(B)=9 to 98:91 to 2, wherein the vinyl-based monomer (b) comprises an aromatic vinyl monomer and a vinyl cyanide monomer, and a ratio of an absorbance in the vicinity of 2238 cm$^{-1}$ derived from the vinyl cyanide monomer ($\alpha 2$) to an absorbance in the vicinity of 1602 cm$^{-1}$ derived from the aromatic vinyl monomer ($\alpha 1$), $\alpha2/\alpha1$, is 0.1 or more and 0.85 or less,
wherein the amount of the modifier is 0.5 to 6 parts by mass per 100 parts by mass of a polycarbonate resin.

2. The polycarbonate modified by a modifier according to claim 1, wherein the ratio $\alpha2/\alpha1$ is 0.3 or more and 0.85 or less.

3. The polycarbonate modified by a modifier according to claim 1, wherein the ethylene copolymer (a) has a number average molecular weight of 10000 to 50000, a molecular distribution of 5 to 15, and a proportion of the polymer having a molecular weight of 10000 or less of 5.5% or more.

4. The polycarbonate modified by a modifier according to claim 2, wherein the ethylene copolymer (a) has a number average molecular weight of 10000 to 50000, a molecular distribution of 5 to 15, and a proportion of the polymer having a molecular weight of 10000 or less of 5.5% or more.

5. The polycarbonate modified by a modifier according to claim 1, wherein the ethylene copolymer (a) has an activation energy of flow of 40 to 120 kJ/mol.

6. The polycarbonate modified by a modifier according to claim 2, wherein the ethylene copolymer (a) has an activation energy of flow of 40 to 120 kJ/mol.

7. The polycarbonate modified by a modifier according to claim 3, wherein the ethylene copolymer (a) has an activation energy of flow of 40 to 120 kJ/mol.

8. The polycarbonate modified by a modifier according to claim 4, wherein the ethylene copolymer (a) has an activation energy of flow of 40 to 120 kJ/mol.

9. A method for producing a polycarbonate composition, comprising:
a polymerization step of synthesizing a graft polymer (A) by graft polymerization of 70 to 20 parts by mass of a vinyl-based monomer (b) in the presence of 30 to 80 parts by mass of an ethylene copolymer (a), with a total amount of (a) and (b) being 100 parts by mass, the vinyl-based monomer (b) containing 1 mass % or more and 35 mass % or less of a vinyl cyanide monomer; and
a mixing step of mixing the resulting graft polymer (A) with a graft polymer (B) prepared by graft polymerization of a vinyl-based monomer to a rubbery polymer to produce a modifier for polycarbonate;
adding 0.5 to 6 parts by mass of the modifier obtained in the mixing step to 100 parts by mass of a polycarbonate resin.

10. The production method according to claim 9, wherein the graft polymer (A) and the graft polymer (B) are melt-kneaded in the mixing step.

11. The production method according to claim 9, wherein the graft polymer (B) prepared by graft polymerization of a vinyl-based monomer to a rubbery polymer is methyl methacrylate-butadiene rubber-styrene resin (B').

12. A modifier for polycarbonate, comprising:
a graft polymer (A) having 30 to 80 parts by mass of a main chain composed of an ethylene copolymer (a) and 70 to 20 parts by mass of a graft chain composed of a structural unit derived from a vinyl-based monomer (b), with a total amount of the main chain and the graft chain of 100 parts by mass; and
a methyl methacrylate-butadiene rubber-styrene resin (B'),
at a mass ratio (A):(B')=9 to 98:91 to 2, wherein
the vinyl-based monomer (b) comprises an aromatic vinyl monomer and a vinyl cyanide monomer, and
a ratio of an absorbance in the vicinity of 2238 $cm^{-1}$ derived from the vinyl cyanide monomer ($\alpha2$) to an absorbance in the vicinity of 1602 $cm^{-1}$ derived from the aromatic vinyl monomer ($\alpha1$), $\alpha2/\alpha1$, is 0.1 or more and 0.85 or less.

13. The polycarbonate modified by a modifier according to claim 1, where the ethylene copolymer is ethylene-1-butene-1-hexene copolymer.

14. The production method according to claim 9, where the ethylene copolymer is ethylene-1-butene-1-hexene copolymer.

15. The modifier for polycarbonate according to claim 12, where the ethylene copolymer is ethylene-1-butene-1-hexene copolymer.

* * * * *